United States Patent
Long et al.

(10) Patent No.: US 11,314,135 B2
(45) Date of Patent: Apr. 26, 2022

(54) ARRAY SUBSTRATE AND METHOD FOR MANUFACTURING THE SAME, DISPLAY DEVICE AND METHOD FOR MANUFACTURING THE SAME

(71) Applicant: BOE TECHNOLOGY GROUP CO., LTD., Beijing (CN)

(72) Inventors: Chunping Long, Beijing (CN); Xinyin Wu, Beijing (CN); Yong Qiao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 434 days.

(21) Appl. No.: 16/343,964

(22) PCT Filed: Sep. 27, 2018

(86) PCT No.: PCT/CN2018/107968
§ 371 (c)(1),
(2) Date: Apr. 22, 2019

(87) PCT Pub. No.: WO2019/085700
PCT Pub. Date: May 9, 2019

(65) Prior Publication Data
US 2021/0333675 A1      Oct. 28, 2021

(30) Foreign Application Priority Data
Nov. 1, 2017   (CN) .......................... 201721438535.2

(51) Int. Cl.
*G02F 1/1362*   (2006.01)
*G02F 1/1368*   (2006.01)

(52) U.S. Cl.
CPC ...... *G02F 1/136295* (2021.01); *G02F 1/1368* (2013.01)

(58) Field of Classification Search
CPC .................. G02F 1/136295; G02F 1/1368
(Continued)

(56) References Cited

U.S. PATENT DOCUMENTS

| 6,839,117 | B1   | 1/2005 | Park et al. |
| 7,643,102 | B2 * | 1/2010 | Mori ................. G02F 1/134363 349/48 |

(Continued)

FOREIGN PATENT DOCUMENTS

| CN | 101416105 A | 4/2009 |
| CN | 101718930 A | 6/2010 |

(Continued)

OTHER PUBLICATIONS

International Search Report; Application No. PCT/CN2018/107968; dated Dec. 3, 2018; English Translation Attached.

(Continued)

*Primary Examiner* — Charles S Chang
(74) *Attorney, Agent, or Firm* — Nath, Goldberg & Meyer; Joshua B. Goldberg

(57) ABSTRACT

Provided are an array substrate and a method for manufacturing the same, a display device and a method for manufacturing the same. In the array substrate, the drain of the thin film transistor is extended to form a drain extension line, wherein the drain extension line is between adjacent sub-pixel units of the pixel region, thus it can block the light at the boundary between the sub-pixel units, thereby avoiding light leakage duo to the disordered electric field at the boundary between the sub-pixel units. The array substrate of the present disclosure is suitable for a multi-domain oriented IPS mode array substrate. The drain extension line can be used as a light blocking strip to prevent light leakage due to the disordered electric field at the boundary between the (Continued)

sub-pixels, and is overlapped with the middle portion of the common electrode line to form a storage capacitor.

20 Claims, 3 Drawing Sheets

(58) Field of Classification Search
USPC .................................................. 349/139–148
See application file for complete search history.

(56) References Cited

U.S. PATENT DOCUMENTS

| | | |
|---|---|---|
| 8,064,018 B2 | 11/2011 | Shoraku et al. |
| 8,334,954 B2 | 12/2012 | Shoraku et al. |
| 2008/0007681 A1* | 1/2008 | Chen ................ G02F 1/133707 |
| | | 349/129 |
| 2009/0244462 A1 | 10/2009 | Tsubata |
| 2011/0157121 A1 | 6/2011 | Chan |
| 2017/0003559 A1 | 1/2017 | Wu et al. |
| 2017/0373096 A1* | 12/2017 | Uchida ................ H01L 27/124 |

FOREIGN PATENT DOCUMENTS

| | | |
|---|---|---|
| CN | 101427178 B | 12/2010 |
| CN | 101416105 B | 4/2011 |
| CN | 101490609 B | 4/2011 |
| CN | 207408720 U | 5/2018 |

OTHER PUBLICATIONS

Extended European Search Report dated Jul. 20, 2021 for application No. EP18873105.3.

* cited by examiner

ARRAY SUBSTRATE AND METHOD FOR MANUFACTURING THE SAME, DISPLAY DEVICE AND METHOD FOR MANUFACTURING THE SAME

CROSS-REFERENCE TO RELATED APPLICATION

This is a National Phase application filed under 35 U.S.C. 371 as a national stage of PCT/CN2018/107968, filed on Sep. 27, 2018, an application claiming the benefit of Chinese Patent Application No. 201721438535.2, filed on Nov. 1, 2017, the disclosure of each which is hereby incorporated by reference.

TECHNICAL FIELD

The present disclosure relates to the field of display technology, and in particular, to an array substrate, a method for manufacturing the array substrate, a display device, and a method for manufacturing the display device.

BACKGROUND

Display panels have been widely used as display screens for consumer electronics such as cell phones, notebook computers, personal computers, and personal digital assistants. The display panel includes an active matrix array substrate in which each active component adjusts the intensity of the light beam to display an image. An existing array substrate includes a plurality of gate lines, a plurality of data lines, and a plurality of pixel units electrically coupled to the corresponding gate lines and the corresponding data lines; light transmittance of each pixel unit is controlled by a transistor respectively. The liquid crystal display includes twisted nematic (TN), Fringe Field Switching (FFS), In-Plane Switching (IPS), and vertical alignment (VA) modes. Among them, the FFS, IPS, and VA modes are wide viewing angle liquid crystal display technologies, in which a pixel structure with a multi-domain design is often adopted, which is advantageous for increasing the viewing angle.

SUMMARY

An embodiment of the present disclosure provide an array substrate, including: plurality of data lines, a plurality of signal lines and a drain extension line, wherein the plurality of data lines and a plurality of signal lines are intersected with each other, the signal lines include first signal lines and second signal lines, and wherein a pixel region is defined by two adjacent first signal lines and two adjacent data lines, the pixel region includes a thin film transistor and a plurality of sub-pixels, wherein the thin film transistor includes a drain, each of the sub-pixel units has a sub-pixel electrode, and the sub-pixel electrode is electrically coupled to the drain of the thin film transistor; and a drain extension line is in the pixel region and configured to be electrically coupled to the drain and between the sub-pixel units.

In some implementations, the drain extension line includes a via, and the sub-pixel electrode is electrically coupled to the drain extension line through the via.

In some implementations, the drain extension line is in parallel with the data lines, and the drain extension line has a width ranging from 2 micrometers to 20 micrometers.

In some implementations, one of the first signal line and the second signal line is a scan line, and the other one of the first signal line and the second signal line is a common electrode line; a gate of the thin film transistor is coupled to the scan line, and a source of the thin film transistor is coupled to the data line.

In some implementations, the first signal line is the scan line, and the second signal line is the common electrode line, wherein in the pixel region, the scan line is between two adjacent common electrode lines, and the pixel region is divided by the scan line into two sub-pixel regions arranged symmetrically with respect to the scan line, each of the sub-pixel regions comprises a thin film transistor and two sub-pixel units, and each of sub-pixel regions is provided with the drain extension line.

In some implementations, each of the sub-pixel units further includes a sub-common electrode, wherein the sub-common electrode is coupled to a common electrode line, and the sub-common electrode and the sub-pixel electrode are in a same layer.

In some implementations, at least one of the sub-pixel electrode and the sub-common electrode is a comb electrode, and the comb electrode includes a plurality of strip-shaped comb teeth arranged in parallel, and an angle between the comb teeth and the common electrode line is greater than 0° and less than 90°.

In some implementations, an angle between the comb teeth and the common electrode line is greater than 30° and less than 60°.

In some implementations, the comb teeth have same widths and pitches between every adjacent two of the comb teeth are the same.

In some implementations, an orthographic projection, on a base substrate, of an end of the drain extension line away from the drain is overlapped with an orthographic projection of the common electrode line on the base substrate.

In some implementations, a portion of the common electrode line protrudes towards the drain at a position overlapped with the orthographic projection, on the base substrate, of the end of the drain extension line away from the drain.

An embodiment of the present disclosure provides a display device including the above array substrate.

An embodiment of the present disclosure provides a method for manufacturing an array substrate, including: forming a plurality of data lines and a plurality of signal lines intersected with each other, wherein the signal lines include first signal lines and second signal lines, a pixel region is defined by two adjacent first signal lines and two adjacent data lines; forming a thin film transistor and a plurality of sub-pixel units in the pixel region, the thin film transistor includes a drain, each of the sub-pixel units has a sub-pixel electrode, and the sub-pixel electrode of the sub-pixel unit is electrically coupled to the drain of the thin film transistor; and forming a drain extension line in the pixel region such that the drain extension line is electrically coupled to the drain and is between the sub-pixel units.

In some implementations, forming a drain extension line in the pixel region further includes: forming the drain extension line in a same layer as the drain.

In some implementations, forming a drain extension line in the pixel region further includes: forming the drain extension line in a different layer from the drain.

In some implementations, forming a drain extension line in the pixel region further includes: forming a via in the drain extension line; and electrically coupling the sub-pixel electrode of each of the sub-pixel units to the drain extension line through the via.

In some implementations, one of the first signal line and the second signal line is a scan line, and the other one of the first signal line and the second signal line is a common electrode line, a gate of the thin film transistor is coupled to the scan line, a source of the thin film transistor is coupled to the data line, wherein forming a drain extension line in the pixel region further includes: forming the drain extension line such that an orthographic projection, on a base substrate, of an end of the drain extension line away from the drain is overlapped with an orthographic projection of the common electrode line on the base substrate.

In some implementations, the first signal line is the scan line and the second signal line is the common electrode line, wherein in the pixel region, the scan line is formed between two adjacent common electrode lines, and the pixel region is divided by the scan line into two sub-pixel regions arranged symmetrically, each of the sub-pixel regions comprises a thin film transistor and two sub-pixel units, wherein forming a drain extension line in the pixel region further comprises: forming the drain extension line in each of the sub-pixel regions.

In some implementations, forming the plurality of signal lines further includes: forming the common electrode line such that a portion of the common electrode line protrude towards the drain at a position overlapped with the orthographic projection, on the base substrate, of the end of the drain extension line away from the drain.

An embodiment of the present disclosure provides a method for manufacturing a display device, including the above method for manufacturing an array substrate.

Figure 1:
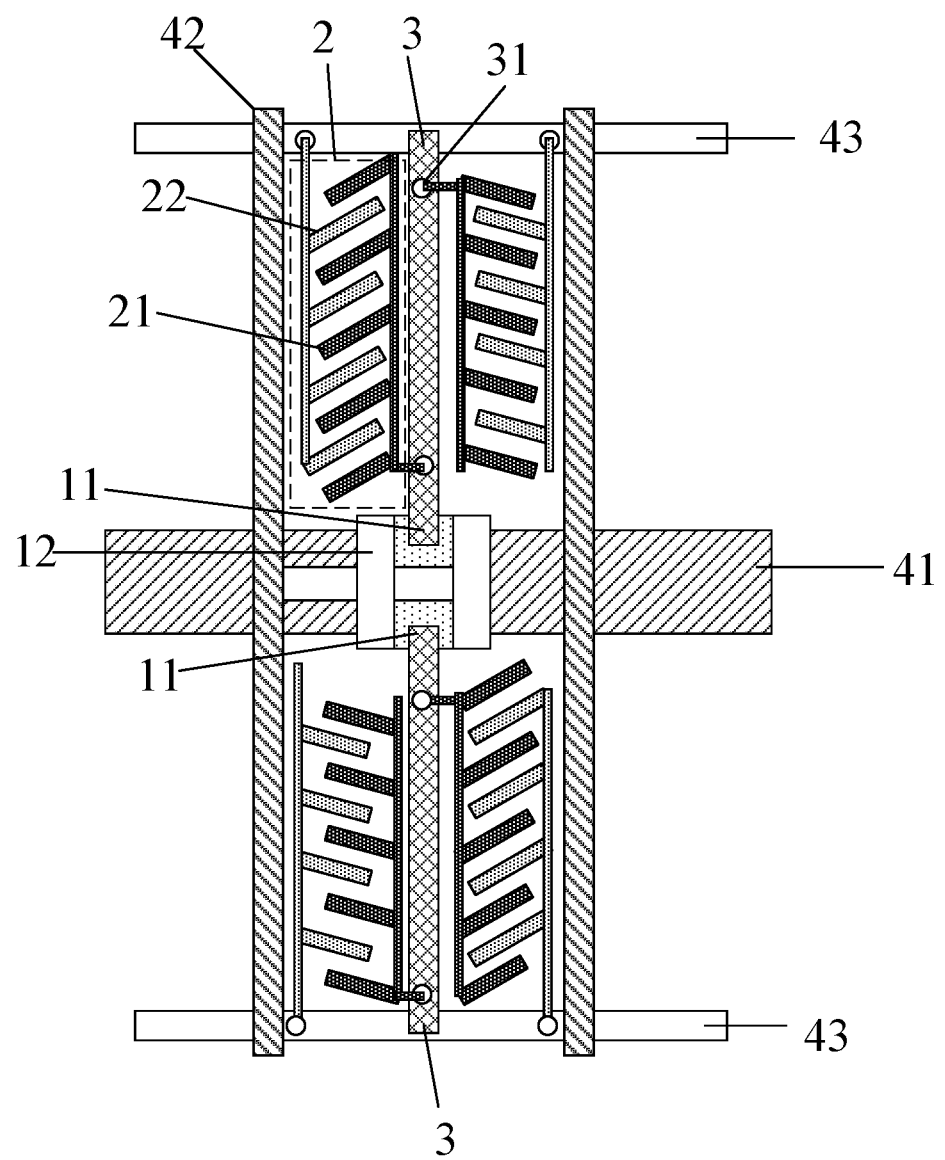
FIG. 1 is a schematic structural diagram of an array substrate according to an embodiment of the present disclosure.

Wherein, the reference numerals are: 11, drain; 12, source; 2, sub-pixel unit; 21, sub-pixel electrode; 22, sub-common electrode; 3, drain extension line; 31, first via; 41, scan line; 42, data line; 43, common electrode line.

DETAILED DESCRIPTION

In order to enable those skilled in the art to better understand the technical solutions of the present disclosure, the present disclosure will be further described in detail below in conjunction with the drawings and specific embodiments.

In the multi-domain design of liquid crystal display devices with the conventional VA, FFS, and IPS mode liquid crystal display devices, an electric field at the domain boundary is disordered, thereby easily resulting in light leakage or reduction in an aperture ratio.

An embodiment of the present disclosure provides an array substrate, as shown in FIG. 1, including a plurality of data lines 42 and a plurality of signal lines intersected with each other, the signal lines including first signal lines and second signal lines. One of the second signal lines is between adjacent two of the first signal lines. The two adjacent first signal lines and two adjacent data lines define a pixel region. The pixel region includes two sub-pixel regions symmetrically arranged about the second signal line, and each of the sub-pixel regions includes a thin film transistor and two sub-pixel units 2 arranged side by side.

The thin film transistor includes a drain 11. Each of the sub-pixel units 2 has a sub-pixel electrode 21. In each of sub-pixel units, the sub-pixel electrode 21 is electrically coupled to the drain 11 of the thin film transistor. The array substrate further includes drain extension lines 3, each of which is electrically coupled to a corresponding drain 11, and each of the drain extension lines 3 is located at a position between adjacent data lines 42 of the pixel region, as shown in FIG. 1, each of the drain extension line 3 is located between two adjacent sub-pixel units 2. The drain extension line may be formed of an opaque conductive material and electrically coupled to the drain 11. Further, the drain extension line can be formed using the same material as the drain.

The data lines 42 in the array substrate of the present embodiment are arranged in a longitudinal direction shown in FIG. 1, the signal lines are arranged in a lateral direction shown in FIG. 1, and the data lines and the signal lines are intersected with each other, wherein two adjacent first signal lines and two adjacent data lines define the pixel region. In this embodiment, the drain 11 of the thin film transistor is extended to form the drain extension line 3, wherein the drain extension line 3 is located between two adjacent sub-pixel units 2, so that the light at a boundary between the sub-pixel units 2 can be blocked, and light leakage caused by the disordered electric field at the boundary between the sub-pixel units 2 can be avoided.

Figure 2:
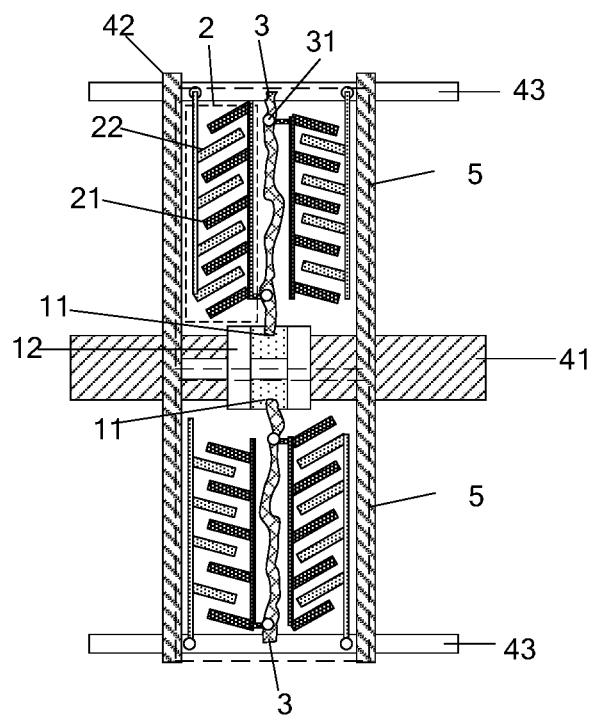
FIG. 2 to FIG. 3 are schematic structural diagrams of an array substrate according to an embodiment of the present disclosure.

An embodiment of the present disclosure provides an array substrate, as shown in FIG. 2, including a plurality of data lines 42 and a plurality of signal lines intersected with each other. The signal lines includes first signal lines and second signal lines, and the second signal line is located between two adjacent first signal lines. A region enclosed by two adjacent first signal lines and two adjacent data lines is defined as a pixel region. The pixel region includes two sub-pixel regions arranged symmetrically with respect to the second signal line. Each of the sub-pixel regions includes a thin film transistor and two sub-pixel units 2 arranged side by side. The thin film transistor includes a drain 11, each of the sub-pixel units 2 has a sub-pixel electrode 21. In each of the sub-pixel regions, the sub-pixel electrode 21 of each of the sub-pixel units is electrically coupled to the drain 11 of the thin film transistor. The array substrate further includes a drain extension lines 3 electrically coupled to the drains 11 respectively, and each of the drain extension lines 3 is located at a position between two sub-pixel units 2 in a same sub-pixel region. Further, each of the drain extension lines 3 is provided with first vias 31 through which the sub-pixel electrodes 21 are electrically coupled to the drain 11 respectively.

In the array substrate in the present embodiment, since the drain is extended, the sub-pixel electrode 21 can be electrically coupled to any portion of the drain extension line 3, so that the sub-pixel electrode 21 is coupled to the drain 11, which functions to add coupling points of the drain 11, enhancing the electrical coupling between the sub-pixel electrode 21 and the drain 11. The sub-pixel electrodes 21 and the drain extension line 3 are in different layers, therefore, by providing the first vias 31, the sub-pixel electrodes 21 can be coupled to the drain extension line 3 through the first vias 31.

In a specific implementation, the array substrate includes a plurality of laterally provided scan lines 41, a plurality of data lines 42 and a plurality of common electrode lines 43. A gate of the thin film transistor is coupled to one of the scan lines 41, and a source of the thin film transistor 12 is coupled to one of the data lines 42. A region enclosed by two adjacent common electrode lines 43 and two adjacent data lines 42 is defined as the pixel region, and the pixel region includes two sub-pixel regions symmetrically arranged with respect to the scan line 41, and each of the sub-pixel regions includes two sub-pixel units 2. The drain extension lines 3 are respectively located at a position between two sub-pixel units 2 in a same sub-pixel region.

It should be noted that in the drawing, the case where the common electrode line 43 is used as the first signal line and the scan line 41 is used as the second signal line has been described. It can be understood that the case where the scan line 41 is used as the first signal line and the common electrode line 43 is used as the second signal line, that is, the case where a region enclosed by the scan lines 41 and the adjacent data line 42 is defined as a pixel region is similar to above, and details thereof are not described herein again.

Figure 3:
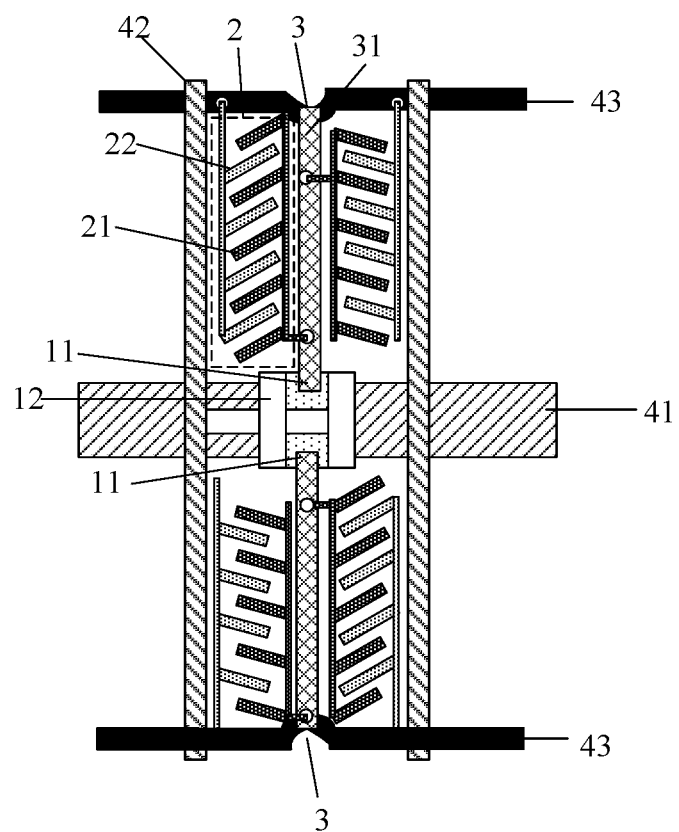
Figure 4:
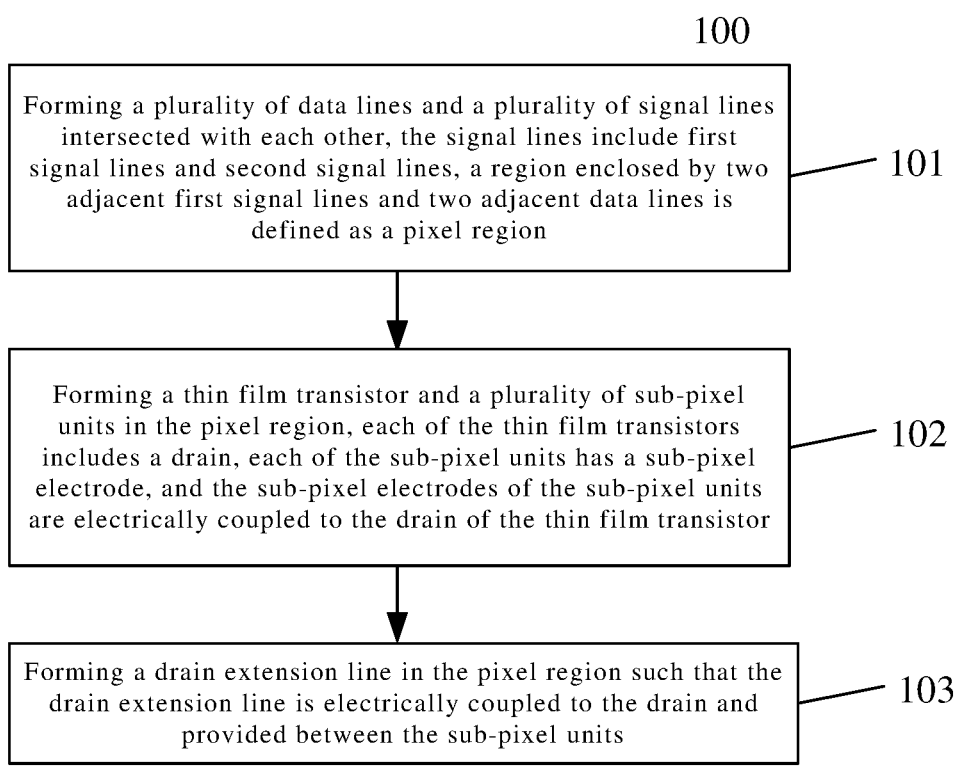
FIG. 4 is a flow chart showing a method for manufacturing an array substrate according to an embodiment of the present disclosure.

A four-domain-oriented array substrate in the above embodiment of the present disclosure is shown in FIGS. 1 to 3. The scan line 41 divides a pixel region into an upper part and a lower part. A sub-pixel region is represented by the dotted line frame 5, and a sub-pixel unit 2 is represented by the dotted line frame 2, that is, two sub-pixel units 2, which are provided at left and right respectively, are provided above (or on an upper side of) the scan line 41, and other two sub-pixel units 2, which are at left and right respectively, are provided below (or on a lower side of) the scan line 41. Two thin film transistors are provided in an active region above the scan line 41, wherein the upper one of the thin film transistors is used for controlling the two sub-pixel units 2 above (or on a side of) the scan line 41, and the lower one of the thin film transistors is used for controlling the two sub-pixel units 2 below (or on the other side of) the scan line 41. Specifically, a source 12 of corresponding one of the thin film transistors is coupled to a corresponding data line 42. The drain extension line 3 is formed by extending the drain 11. The drain extension line 3 for the thin film transistor is of a strip shape and runs through the sub-pixel region. The drain of the thin film transistor on the upper side extends upwardly between the two adjacent sub-pixel units 2 above the scan line 41, and the drain of the thin film transistor on the lower side extends downward between the two adjacent sub-pixel units 2 below the scan line 41. Specifically, a width of the drain extension line 3 ranges from 2 micrometers to 20 micrometers, and a length of a single drain extension line 3 is approximately equal to half the height of the pixel region.

It should be noted that although the four-domain-oriented array substrate has been described as an example with reference to FIGS. 1 to 3 in the present embodiment, the present disclosure is not limited thereto. For example, the technical solution of the present disclosure is also applicable to a two-domain-oriented or more-domain-oriented array substrate, and the implementation manner thereof is similar to the present embodiment, details of which is not described herein again.

In a specific implementation, the drain extension lines 3 are in parallel with the data lines 42.

FIG. 1 shows that the drain extension lines 3 are in parallel with the data lines 42, that is, each of the drain extension lines 3 is perpendicular to the scan line 41. It can be understood that the drain extension line 3 can also be of a curved shape or an irregular shape as shown in FIG. 2, and the specific shapes thereof are not enumerated herein, and all can be obtained by an etching process.

In a specific implementation, one end of the drain extension line 3 away from the drain 11 is overlapped with the common electrode line 43, that is, an orthographic projection of one end of the drain extension line 3 away from the drain 11 on a base substrate is overlapped with an orthographic projection of the common electrode line 43 on the base substrate.

That is to say, a portion of the drain extension line 3 proximal to the common electrode line 43 is overlapped with a portion of the common electrode line 43, so that a storage capacitor can be formed therebetween.

In a specific implementation, a portion of the common electrode line 43 overlapped with the orthographic projection of the drain extension line 3 on the base substrate protrudes toward the drain 11.

As shown in FIG. 3, a middle portion of the common electrode line 43 at the upper side in the drawing protrudes downward, which can increase overlapping area between the common electrode line 43 and the drain extension line 3. Therefore, thus arrangement can increase the storage capacitance between the common electrode line 43 and the drain extension line 3. Similarly, FIG. 3 also shows that a middle portion of the common electrode line 43 at the lower side in the drawing protrudes upward, which can increase the overlapping area between the common electrode line 43 and the drain extension line 3. thereby increasing the storage capacitance between the common electrode line 43 and the drain extension line 3.

In a specific implementation, the sub-pixel unit 2 further includes a sub-common electrode 22 coupled to the common electrode line 43, wherein the sub-common electrode 22 is provided in the same layer as the sub-pixel electrode 21.

That is, the present embodiment is applicable to a multi-domain-oriented array substrate of IPS mode. As can be seen from the drawing, the strip-shaped drain extension line 3 is provided at the boundary between domains, thus the viewing angle is enlarged, on one hand, the drain extension line 3 can be used as a light-blocking strip at the boundary between domains to prevent light leakage due to a disordered electric field at the boundary, on the other hand, the drain extension line 3 can be overlapped with the middle portion of the common electrode line 43 to form a storage capacitor. It can be understood that an angle between the sub-common electrode 22 of the sub-pixel unit 2 and the common electrode line 43 (also referred to as an interdigital tilt angle) can be selected according to actual conditions.

In a specific implementation, both of the sub-pixel electrode 21 and the sub-common electrode 22 are comb electrodes, each of which includes a plurality of strip-shaped comb teeth arranged in parallel, and an angle between the comb teeth of the sub-pixel electrode 21 and the common electrode line 43 is $\alpha$, $\alpha$ satisfies the condition of $90°>\alpha>0°$, and an angle between the comb teeth of the sub-common electrode 22 and the common electrode line 43 is $\beta$, $\beta$ satisfies the condition of $90°>\beta>0°$.

Specifically, the sub-pixel electrode 21 and the sub-common electrode 22 are strip-shaped electrodes provided in a same layer, and tilt directions of the strip-shaped electrodes in the two adjacent sub-pixel units in a same sub-pixel region may be identical or different.

In a specific implementation, the angle $\alpha$ satisfies the condition of $60°>\alpha>30°$; and the angle $\beta$ satisfies the condition of $60°>\beta>30°$.

In a specific implementation, $\alpha=\beta$.

Referring to the drawings, the interdigital tilt angles between the sub-common electrodes 22 of the two adjacent sub-pixel units in a same sub-pixel region 5 and the common electrode line 43 may be identical or different. The sub-common electrodes 22 of the two sub-pixel units adjacent to each other in a horizontal direction and the common electrode line 43 may be axisymmetric with the drain extension line 3 as an axis, or the sub-common electrodes 22 of the two sub-pixel units adjacent to each other in a vertical direction and the common electrode lines 43 may be axisymmetric with the scan line 41 as an axis, which can be selected based on actual applications.

In a specific implementation, a width of the sub-pixel electrode 21 is the same as a width of the sub-common electrode 22, pitches between every two adjacent comb teeth of the sub-pixel electrode 21 are the same, and pitches between any two adjacent comb teeth of the sub-common electrode are the same as each other.

Specifically, each of the comb teeth of the sub-pixel electrode 21 may have a width ranging from 2 micrometers and 10 micrometers and a length ranging from 2 micrometers to 50 micrometers. Each of the comb teeth of the sub-common electrode 22 has a width ranging from 2 micrometers to 10 micrometers and a length ranging from 2 micrometers to 50 micrometers. More specifically, the comb teeth of the sub-pixel electrode 21 and the comb teeth of the sub-common electrode 22 are alternately arranged. Each of pitches of every two adjacent comb teeth of the sub-pixel electrode 21 ranges from 4 micrometers to 20 micrometers, and each of pitches of every two adjacent comb teeth of the sub-common electrode 22 ranges from 4 micrometers to 20 micrometers, i.e., a pitch between one of the comb teeth of sub-pixel electrode 21 and one of the comb teeth of sub-common electrode 22 adjacent thereto ranges from 2 micrometers to 10 micrometers.

The array substrate of the present disclosure is particularly suitable for a multi-domain-oriented array substrate of IPS mode.

It should be noted that, in the present embodiment, the case where the sub-pixel electrode 21 and the sub-common electrode 22 are both comb electrodes has been described with reference to FIGS. 1 to 3, but the present disclosure is not limited thereto. For example, the technical solutions of the present disclosure is also applicable to the case where any one of the sub-pixel electrode 21 and the sub-common electrode 22 is a comb electrode, which can be implemented in a similar manner, and details of which is not described herein again.

The sizes, thicknesses, and the like of the respective structures shown in the drawings are merely illustrative. In the process implementation, areas of orthographic projections of structural layers on the base substrate may be the same or different, and so on, which is not enumerated here. Desired areas of orthographic projections of structural layers can be realized through etching processes. Meanwhile, geometric shape of each structural layer is not limited to the structure shown in the drawing, for example, it may be a rectangle as shown in the drawing, may also be a trapezoidal shape, or other shapes formed by etching.

The present embodiment provides a display device including the above array substrate. The display device may be any product or component having a display function, such as a liquid crystal display panel, an electronic paper, a mobile phone, a tablet computer, a television, a display, a notebook computer, a digital photo frame, a navigator, and the like.

An embodiment of the present disclosure provides a method 100 for manufacturing an array substrate, the method comprising the steps of:

S101, forming a plurality of data lines and a plurality of signal lines intersected with each other, the signal lines include first signal lines and second signal lines, a region enclosed by two adjacent first signal lines and two adjacent data lines is defined as a pixel region;

S102, forming a thin film transistor and a plurality of sub-pixel units in the pixel region, the thin film transistor includes a drain, each of the sub-pixel units has a sub-pixel electrode, and the sub-pixel electrodes of the sub-pixel units are electrically coupled to the drain of the thin film transistor;

S103, forming a drain extension line in the pixel region such that the drain extension line is electrically coupled to the drain and provided between the sub-pixel units.

In a specific implementation, the step S103 further includes:

forming the drain extension line in a same layer as the drain.

In a specific implementation, the step S103 further includes:

forming the drain extension in a different layer from the drain.

In a specific implementation, the step S103 further includes:

forming vias in the drain extension line; and electrically coupling the sub-pixel electrodes to the drain extension line through the vias.

In a specific implementation, one of the first signal line and the second signal line is a scan line, the other one of the first signal line and the second signal line is a common electrode line. A gate of the thin film transistor is coupled to the scan line, and a source of the thin film transistor is coupled to the data line, wherein the step of forming the drain extension line in the pixel region further includes:

forming the drain extension line such that an orthographic projection, on a base substrate, of one end of the drain extension line away from the drain is overlapped with an orthographic projection of the common electrode line on the base substrate.

In a specific implementation, the step S101 further includes:

forming the common electrode line such that a portion of the common electrode line protrudes toward the drain at a position overlapped with the orthographic projection, on the base substrate, of one end of the drain extension line away from the drain.

The present disclosure further provides a method for manufacturing a display device, which includes the method for manufacturing an array substrate described above.

In the above array substrate and the method for manufacturing the same, the display device and the method for manufacturing the same of the present disclosure, the drain of the thin film transistor is extended through the drain extension line, and the drain extension line is provided between the adjacent sub-pixel units in a same pixel region. On one hand, the drain extension line can be used as a light blocking strip to prevent light leakage due to the disordered electric field at the boundary between the sub-pixel units, on the other hand, the drain extension line can also be overlapped with the middle portion of the common electrode line to form a storage capacitor.

It should be understood that, the above embodiments are merely exemplary embodiments for explaining principle of the present invention, but the present invention is not limited thereto. Various modifications and improvements may be made by those ordinary skilled in the art within the spirit and essence of the present invention, these modifications and improvements fall into the protection scope of the present invention.

What is claimed is:

1. An array substrate, comprising:
    a base substrate
    a plurality of data lines and a plurality of signal lines located on the base substrate, wherein
    the plurality of data lines and the plurality of signal lines are intersected with each other, the signal lines comprise first signal lines and second signal lines which are arranged alternately, wherein a pixel region is defined by two adjacent first signal lines and two adjacent data lines, the pixel region comprises two sub-pixel regions, each of the two sub-pixel regions comprises a thin film transistor and two sub-pixel units, each of the sub-pixel units has a sub-pixel electrode, and in each of the sub-pixel regions, the sub-pixel electrode is electrically coupled to a drain of the thin film transistor; and
    drain extension lines, which are respectively located in the sub-pixel regions, wherein, in each sub-pixel regions, the drain extension line is configured to be electrically coupled to the drain of the thin film transistor therein, and provided between the sub-pixel units therein, and wherein;
    gates of the thin film transistors are electrically coupled with the second signal line located between the adjacent first signal line, and an orthographic projection of each thin film transistor on the base substrate overlaps with an orthographic projection of the second signal line on the base substrate; and
    each drain extension line runs a length of the sub-pixel region where it is located, and an orthographic projection of the drain extension line on the base substrate overlaps with an orthographic projection of the first signal line on the base substrate at an end of the drain extension line away from the drain of the transistor coupled with the drain extension line.

2. The array substrate according to claim 1, wherein the drain extension line includes a via, and the sub-pixel electrode is electrically coupled to the drain extension line through the via.

3. The array substrate according to claim 1, wherein the drain extension line is in parallel with the data lines, and the drain extension line has a width ranging from 2 micrometers to 20 micrometers.

4. The array substrate according to claim 1, wherein the second signal line is a scan line, and the first signal line is a common electrode line; and
    a source of the thin film transistor is coupled to the data line.

5. The array substrate according to claim 4, wherein the first signal line is the scan line, and the second signal line is the common electrode line, wherein in the pixel region, the scan line is between two adjacent common electrode lines, and the pixel region is divided by the scan line into two sub-pixel regions arranged symmetrically with respect to the scan line, each of the sub-pixel regions comprises a thin film transistor and two sub-pixel units, and each of sub-pixel regions is provided with the drain extension line.

6. The array substrate according to claim 4, wherein each of the sub-pixel units further comprises a sub-common electrode, the sub-common electrode is coupled to the common electrode line, and the sub-common electrode and the sub-pixel electrode are in a same layer.

7. The array substrate according to claim 6, wherein at least one of the sub-pixel electrode and the sub-common electrode is a comb electrode, and the comb electrode comprises a plurality of strip-shaped comb teeth arranged in parallel, and an angle between the comb teeth and the common electrode line is greater than 0° and less than 90°.

8. The array substrate according to claim 7, wherein an angle between the comb teeth and the common electrode line is greater than 30° and less than 60°.

9. The array substrate according to claim 8, wherein the comb teeth have same widths and pitches between every adjacent two of the comb teeth are the same.

10. The array substrate according to claim 9, wherein a portion of the common electrode line protrude towards the drain at a position overlapped with the orthographic projection, on the base substrate, of the end of the drain extension line away from the drain.

11. The array substrate according to claim 4, wherein an orthographic projection of an end of the drain extension line away from the drain on a base substrate is overlapped with an orthographic projection of the common electrode line on the base substrate.

12. A display device comprising the array substrate according to claims 1.

13. A method for manufacturing an array substrate, comprising:
    forming a plurality of data lines and a plurality of signal lines intersected with each other on a base substrate, the signal lines comprising first signal lines and second signal lines which are arranged alternately, wherein a pixel region is defined by two adjacent first signal lines and two adjacent data lines, the pixel region comprises two sub-pixel regions;
    forming, in each of the two sub-pixel regions, a thin film transistor and two sub-pixel units, wherein each of the subpixel units has a sub-pixel electrode, and in each of the sub-pixel regions, the sub-pixel electrode of the sub-pixel unit is electrically coupled to a drain of the thin film transistor; and
    forming, in each of the two sub-pixel regions, a drain extension line such that the drain extension line is electrically coupled to the drain of the thin film transistor therein and is between the sub-pixel units therein, wherein
    gates of the thin film transistors are electrically coupled with the second signal line located between the adjacent first signal line, and an orthographic projection of each thin film transistor on the base substrate overlaps with an orthographic projection of the second signal line on the base substrate; and
    each drain extension line runs a length of the sub-pixel region where it is located, and an orthographic projection of the drain extension line on the base substrate overlaps with an orthographic projection of the first signal line on the base substrate at an end of the drain extension line away from the drain of the transistor coupled with the drain extension line.

14. The method according to claim 13, wherein forming a drain extension line in the pixel region further comprises:
    forming the drain extension line in a same layer as the drain.

15. The method according to claim 13, wherein forming a drain extension line in the pixel region further comprises:
    forming the drain extension line in a different layer from the drain.

16. The method according to 13, wherein forming a drain extension line in the pixel region further comprises:
    forming a via in the drain extension line; and electrically coupling the sub-pixel electrode to the drain extension line through the via.

17. The method according to claim 16, wherein one of the first signal line and the second signal line is a scan line, and the other one of the first signal line and the second signal line is a common electrode line, a gate of the thin film transistor is coupled to the scan line, a source of the thin film transistor is coupled to the data line, wherein forming a drain extension line in the pixel region further comprises:
Forming the drain extension line such that an orthographic projection, on a base substrate, of an end of the drain extension line away from the drain is overlapped with an orthographic projection of the common electrode line on the base substrate.

18. The method according to claim 17, wherein the first signal line is the scan line and the second signal line is the common electrode line, wherein in the pixel region, the scan line is formed between two adjacent common electrode lines, and the pixel region is divided by the scan line into two sub-pixel regions arranged symmetrically, each of the sub-pixel regions comprises a thin film transistor and two sub-pixel units, wherein forming a drain extension line in the pixel region further comprises:
forming the drain extension line in each of the sub-pixel regions.

19. The method according to claim 17, wherein forming the plurality of signal lines further comprises:
forming the common electrode line such that a portion of the common electrode line protrude towards the drain at a position overlapped with the orthographic projection, on the base substrate, of the end of the drain extension line away from the drain.

20. A method for manufacturing a display device, comprising the method for manufacturing an array substrate according to 13.

* * * * *